United States Patent
Zhou et al.

(10) Patent No.: US 6,973,235 B2
(45) Date of Patent: Dec. 6, 2005

(54) OPTICAL FILTER DEVICE HAVING MOLDED, SINGLE-INDEX COLLIMATING LENS

(75) Inventors: Mingbao Zhou, Shenzhen (CN); River Yang, Shenzhen (CN); Qing Liu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 50 days.

(21) Appl. No.: 10/328,581

(22) Filed: Dec. 23, 2002

(65) Prior Publication Data

US 2003/0138204 A1    Jul. 24, 2003

(30) Foreign Application Priority Data

Jan. 18, 2002   (TW) .............................. 91200442 U

(51) Int. Cl.⁷ .............................................. G02B 6/32
(52) U.S. Cl. ............................. 385/33; 385/66; 385/72; 385/74
(58) Field of Search ............................. 385/33, 34, 66, 385/72–74, 139

(56) References Cited

U.S. PATENT DOCUMENTS

| | | | |
|---|---|---|---|
| 4,834,494 A * | 5/1989 | DeMeritt et al. ............. | 385/61 |
| 5,495,545 A * | 2/1996 | Cina et al. ..................... | 385/92 |
| 6,282,339 B1 * | 8/2001 | Zheng .......................... | 385/34 |
| 6,454,465 B1 * | 9/2002 | Uschitsky et al. ............ | 385/79 |
| 6,513,992 B2 * | 2/2003 | Andersen et al. ............. | 385/92 |
| 6,550,984 B2 * | 4/2003 | Andersen et al. ............. | 385/93 |
| 6,582,135 B2 * | 6/2003 | Brun et al. .................... | 385/78 |
| 2002/0076151 A1 * | 6/2002 | Kinard et al. ................. | 385/33 |
| 2003/0103725 A1 * | 6/2003 | Li ................................. | 385/34 |
| 2003/0185507 A1 * | 10/2003 | Lai et al. ...................... | 385/33 |
| 2004/0042720 A1 * | 3/2004 | Asano et al. ................. | 385/34 |

* cited by examiner

*Primary Examiner*—Dean A. Reichard
*Assistant Examiner*—Adolfo Nino
(74) *Attorney, Agent, or Firm*—Wei Te Chung

(57) ABSTRACT

An optical filter device (100) for collimating input signals and selecting optical signals in a predetermined wavelength band includes a dual fiber pigtail (DEP) (112) receiving an input and output optical fibers (113, 114), a molded lens (111), a sleeve (130), and a filter (120). The molded lens between the DFP and the filter has a single index. The molded lens collimates dispersed-light beams coming from the input optical fiber to parallel-light beams, and converges the parallel-light beams reflected by the filter for transmission into the output optical fiber. The filter absorbs optical light beams in predetermined wavelength bands. The sleeve allows connection of the filter to the lens without requiring use of epoxy on optically functional parts of the molded lens.

9 Claims, 3 Drawing Sheets

OPTICAL FILTER DEVICE HAVING MOLDED, SINGLE-INDEX COLLIMATING LENS

BACKGROUND OF THE INVENTION

1. Field of the Invention

The present invention generally relates to the field of optical filter devices, and more particularly to an optical filter device having a molded, single-index lens therein. This application relates to the applications Ser. Nos. 10/170,550 filed Jun. 11, 2002 and 10/163,822 filed Jun. 5, 2002, the latter application now U.S. Pat. No. 6,694,077, said applications having the same inventors and the same assignee as the present invention.

2. The Related Arts

The demand for higher transmission capacity and speed in optical communication systems is unrelenting. Dense Wavelength Division Multiplexing (DWDM) technology has been an important development to satisfy these demands, and is now widely used in optical communications systems.

A Graded Index (GRIN) lens is a popular optical collimating element, which is utilized in an optical filter device for collimating scattered light. As shown in FIG. 5, a conventional filter 10 comprises an input optical fiber 17, an output optical fiber 18, a ferrule 13, a GRIN lens 12, a filter 14 and a sleeve 16. The input and output optical fibers 17, 18 are received in a through hole (not labeled) of the ferrule 13. The ferrule 13 and the GRIN lens 12 are aligned and fixed in the sleeve 16 with epoxy resin. The filter 14 is attached to an end surface of the GRIN lens 12 with two epoxy resins. One type is UV epoxy, and the other type is NDT epoxy. UV epoxy has less fluidity and viscosity than NDT epoxy. In assembly, UV epoxy is first applied at an interface 15 between the GRIN lens 12 and the filter 14. Then the NDT epoxy is applied around an outer surface of the filter 14. A relatively large amount of NDT epoxy is required to cover the entire expanse of the interface 15. The filter 10 is baked to permanently cure the NTD epoxy and the UV epoxy. The GRIN lens 12 and the filter 14 are thus fastened to each other.

The conventional filter device 10 has some disadvantages. First, the filter 14 is directly attached onto the surface of the GRIN lens 12 by epoxy resin. During baking of the two types of epoxy resin, the filter 14 is subjected to uneven heating. This changes and adversely affects performance of the filter 14. Second, the GRIN lens 12 is conventionally made using the ion exchange method. This method requires that the GRIN lens 12 must be polished after initial formation, and this makes the GRIN lens 12 relatively expensive. Furthermore, chemicals used in the ion exchange method are harmful to workers and pollute the environment.

Therefore, an improved optical filter device that overcomes the above-described disadvantages of the conventional filter device is desired.

SUMMARY OF THE INVENTION

An object of the present invention is to provide an optical filter device in which the collimating element is a molded lens.

Another object of the present invention is to provide an inexpensive optical filter device which yields good optical performance.

Yet another object of the present invention is to provide an optical filter device, the manufacture of which is more environmentally friendly.

To achieve the above-mentioned objects, a filter device for collimating optical signals in an optical system and selecting a predetermined wavelength band therefrom includes a fiber pigtail having at least one optical fiber, a molded lens collimating the optical signals coming from the at least one optical fiber, and a filter for selecting the optical signals in the predetermined wavelength band. The molded lens between the fiber pigtail and the filter has a single index. The molded lens collimates dispersed-light beams coming from the at least one optical fiber to parallel-light beams, and, conversely, focuses parallel-light beams not of the selected wavelength band which are reflected by the filter for transmission by the at least one or more optical fiber.

DETAILED DESCRIPTION OF THE INVENTION

Figure 1:
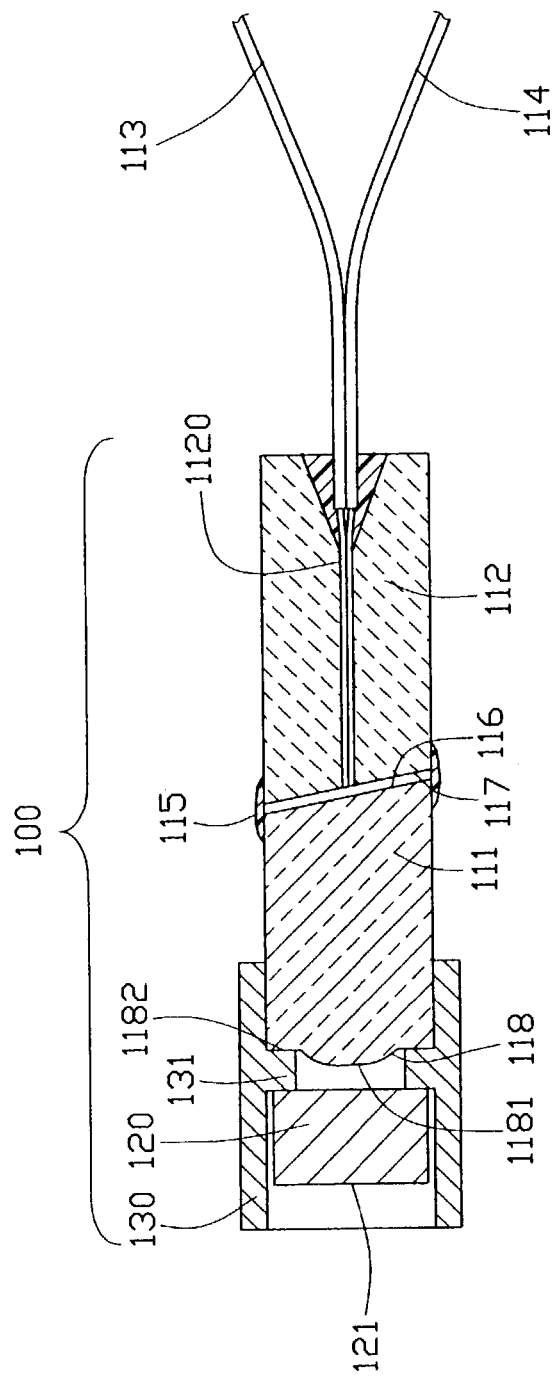
FIG. 1 is a cross-sectional view of an optical assembly in accordance with a preferred embodiment of the present invention.

Referring to FIG. 1, an optical filter device 100 in accordance with the present invention is used to collimate optical signals transmitted in an optical system and to select signals of predetermined wavelengths therefrom. The filter device 100 comprises a dual fiber pigtail (DFP) 112, a molded lens 111 for collimating the optical light beams transmitted in the optical system, and a filter 120 for selecting the optical light beams in a predetermined band of wavelengths.

The DFP 112 is an elongated tube having a hollowed out interior aperture 1120 extending longitudinally therethrough. The interior aperture 1120 accommodates an input and output optical fibers 113, 114, which are fixed therein by use of epoxy resin (not labeled). The DFP 112 further has an angled front surface 117, which is coplanar with two ends (not labeled) of the two optical fibers 113, 114. To improve the optical performance, the angled front surface 117 and the two coplanar fiber ends are polished at an oblique angle relative to an imaginary plane perpendicular to a longitudinal axis of the DFP 112. The oblique angle is preferably between 6 and 8 degrees.

The molded lens 111 is made of glass or another suitable material with a single index. The molded lens 111 has an angled back surface 116 which is fixed parallel and opposite to the angled front surface 117, and a front end face 118. The front end face 118 comprises a curved face 1181 and a shoulder 1182, the shoulder 1182 being formed around a periphery of the curved face 1181.

The filter device 100 further comprises a cylindrical sleeve 130. The cylindrical sleeve 130 has a through hole (not labeled) along a longitudinal axis, and an annular protrusion 131 projecting inwardly from an inner wall (not labeled) thereof. The protrusion 131 has a forward and a rearward side walls (not labeled).

The angled front surface 117 of the DFP 112, and the angled back surface 116 and the front end face 118 of the molded lens 111 are all covered with anti-reflective coatings to minimize reflection of light signals traveling through the filter device 100. In assembly, the filter 120 is attached to the forward sidewall of the protrusion 131 with epoxy resin, and the molded lens 111 is fixed on the rearward sidewall of the protrusion 131, whereby the filter 120 is opposed to the curved face 1181 of the molded lens 111. The DFP 112 and the molded lens 111 are held in fixed relation to one another, with the longitudinal axis of each being collinear. The angled front surface 117 and the angled back surface 116 are held parallel with epoxy resin 115, with a distance between the angled front and back surfaces 117, 116 being 0.025±0.015 mm.

Figure 2:
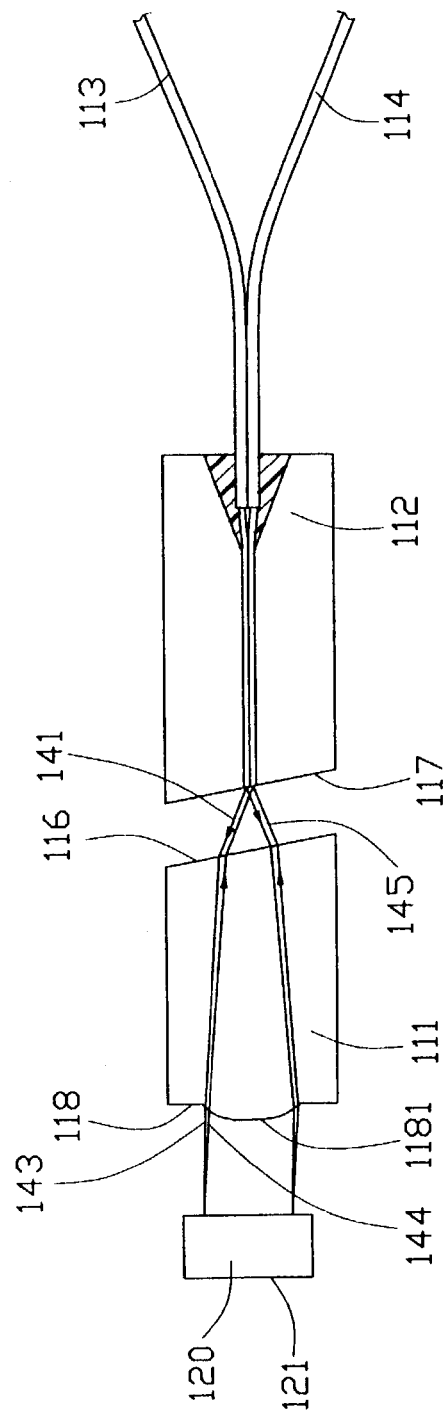
FIG. 2 is an essential optical paths diagram of the optical assembly in FIG. 1.

FIG. 2 shows an essential optical pats diagram of the filter device 100. Dispersed-light beams 141 from the input optical fiber 113 are collimated to parallel-light beams 143 by the molded lens 111, and then transmitted to the filter 120. The filter 120 is an absorption filter made of a material (e.g., germanium) that exhibits high absorption in a specific wavelength region. The filter 120 absorbs specific wavelength bands of the input parallel-light beams 143, and further has a reflective surface 121 to reflect back remaining light beams 144 within a predetermined wavelength band. Traveling in a reverse direction through the molded lens 111, the parallel-light beams 144 reflected by the filter 120 are focused to convergent-light beams 145 and are transmitted through the output optical fiber 114.

Figure 3:
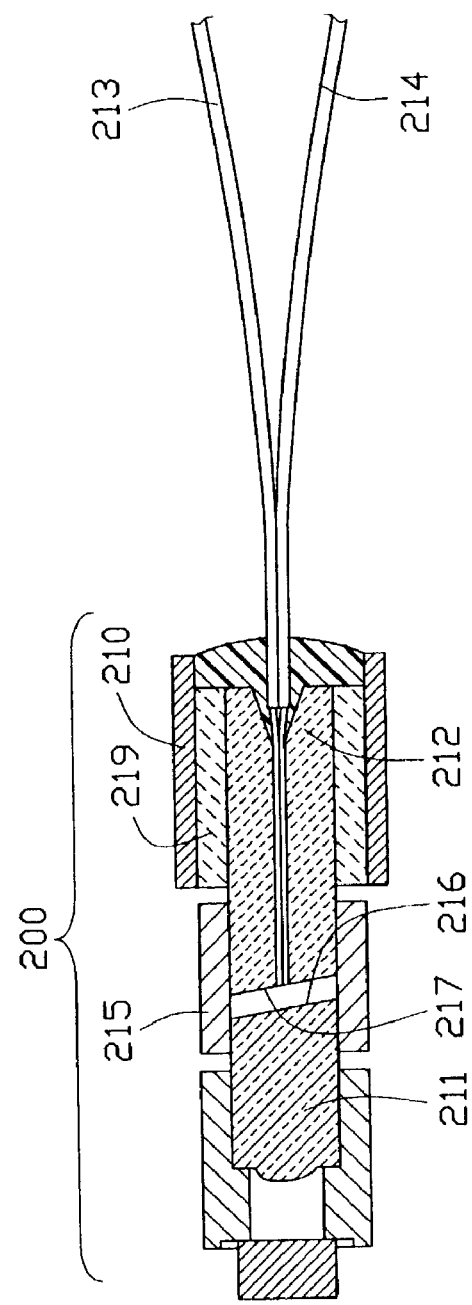
FIG. 3 is a cross-sectional view of an optical assembly in accordance with an alternative embodiment of the present invention.

FIG. 3 shows an alternative embodiment filter device 200 in accordance with the present invention. The filter device 200 makes use of a first tube 215 to receive one end of each of a molded lens 211 and a DFP 212 therein, for holding the molded lens 211 and the DFP 212 in fixed relation to one another. A distance between an angled front surface 217 of the DFP 212 and an angled back surface 216 of the molded lens 211 is larger than 0.04 mm. A second and a third tubes 219, 210 accommodate the DFP 212 to protect the DFP 212, wherein the second tube 219 receives another end (not labeled) of the DFP 212 and is contained in the third tube 210. The third tube 210 is longer than the second tube 219, so that epoxy resin can fill in a rearward portion of the third tube 210 to prevent the input and output optical fibers 213, 214 from flexing excessively.

Figure 4:
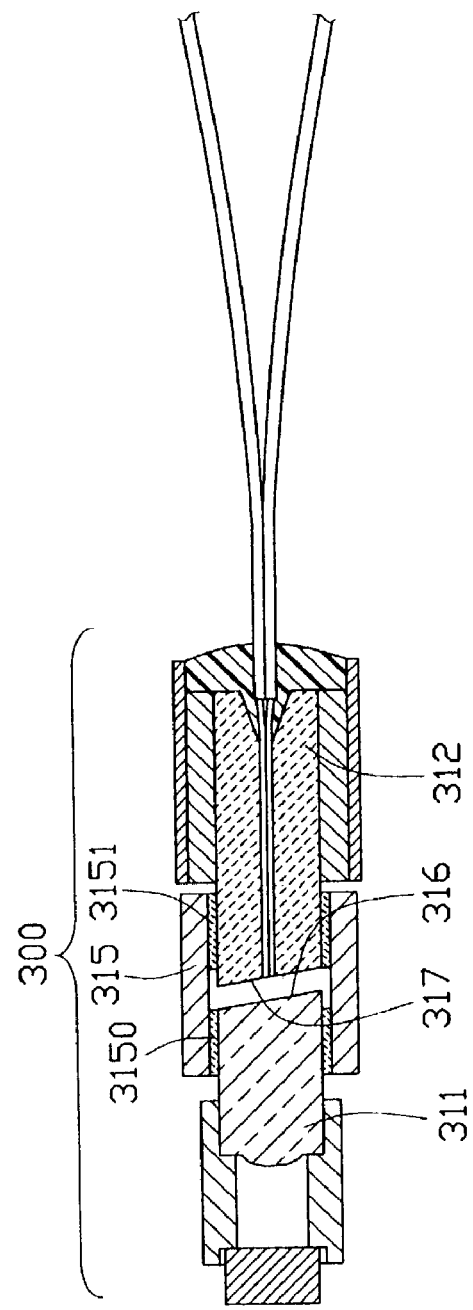
FIG. 4 is a cross-sectional view of an optical assembly in accordance with another alternative embodiment of the present invention.
Figure 5:
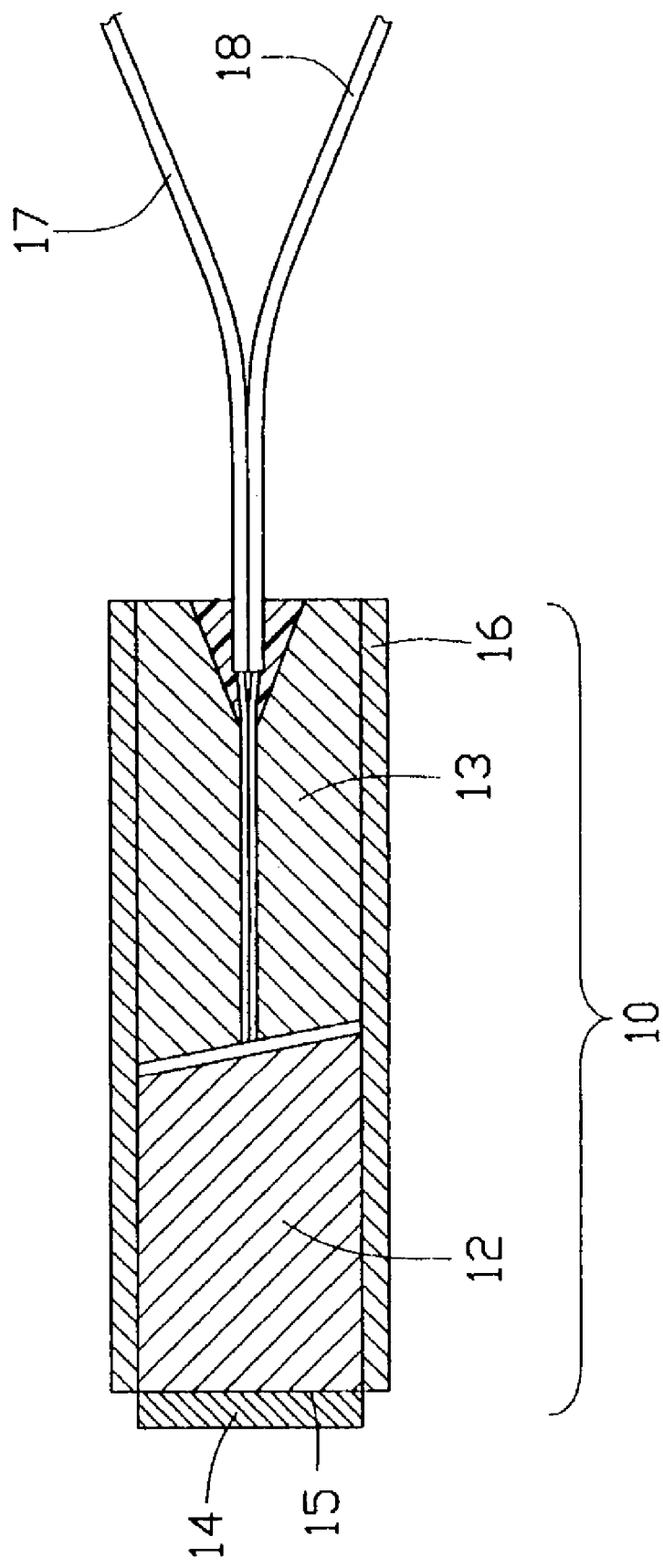
FIG. 5 is a cross-sectional view of a conventional optical filter device.

FIG. 4 shows another alternative embodiment filter device 300 in accordance with the present invention. The filter device 300 is similar to the filter device 200, but has another two sleeves 3150, 3151 with a same outside diameter. The sleeve 3150 receives one end (not labeled) of a molded lens 311 having an angled back surface 316, and the sleeve 3151 receives one end (not labeled) of a DFP 312 having an angled front surface 317. The molded lens 311 and the DFP 312 are held in fixed relation to each other by a first tube 315, which contains the two sleeves 3150, 3151. An inside diameter of the first tube 315 is slightly larger than the outside diameter of the two sleeves 3150, 3151, for aligning the molded lens 311 with the DFP 312.

The filter device 100 of the preferred embodiment of the present invention has the following advantages. No epoxy resin is required between the filter 120 and any optically functional part of the molded lens 111. Accordingly, there are no problems with uneven heating. Additionally, the molded lens 111 can be formed as one integral, high-precision unit that does not require further polishing. This reduces costs. Furthermore, the material used to make the molded lens 111 is inexpensive, safe for workers and environmentally friendly. The above-described benefits are equally applicable to the filter devices 200, 300 of the alternative embodiments of the present invention.

Further alternative embodiments of the present invention may include single fiber optical filter devices as well as the dual fiber optical filter devices described, and may further include other, similar optical devices, such as substituting the described filter with a Fabry-Perot Interferometer, a Bragg Grating, or a Fiber Bragg Grating.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What claimed is:

1. An optical filter device adapted to collimate optical signals coming from at least one optical fiber, and to select signals in a predetermined wavelength band from said optical signals to output, comprising:
   at least one fiber pigtail for receiving and fixing the at least one optical fiber;
   a molded lens fixed in series with the fiber pigtail for collimating the optical signals coming from the at least one optical fiber; and
   a filter opposed to the molded lens and adapted to select signals of a predetermined wavelength;
   wherein the molded lens is located between the fiber pigtail and the filter and has a single index, and collimates dispersed-light beams coming from the at least one optical fiber to parallel-light beams, and converges parallel-light beams of the predetermined wavelength which are reflected by the filter to pass into the at least one optical fiber.

2. The optical filter device of claim 1, wherein the optical filter device further comprises a sleeve for fixing the filter and the molded lens together in relative engagement with each other.

3. The optical filter device of claim 1, wherein the molded lens is connected with the fiber pigtail by epoxy resin or a tube.

4. The optical filter device of claim 1, wherein the molded lens further has an angled back surface parallel and opposite to an angled front surface of the fiber pigtail.

5. The optical filter device of claim 4, wherein the two angled front and back surfaces and a front end of the molded lens are covered with anti-reflective coatings.

6. The optical filter device of claim 4, wherein a distance between the two angled front and back surfaces is larger than 0.04 mm.

7. The optical filter device of claim 1, wherein the filter further comprises a reflective surface to reflect light signals.

8. An optical filter device comprising:
   a fiber pigtail receiving at least one optical fiber therein;
   a molded lens fixed to said fiber pigtail and having a curved face at a front portion thereof;
   a filter oppositely and axially spatially positioned in front of said molded lens; and
   a holding device including a cylindrical sleeve to retain the front portion of the lens and the filter therein.

9. The optical filter device of claim 8, wherein said holding device further includes an interior annual protrusion against which said filter and said front portion of the lens axially abut, respectively.

* * * * *